(12) United States Patent
Fairbanks

(10) Patent No.: US 7,126,405 B2
(45) Date of Patent: Oct. 24, 2006

(54) METHOD AND APPARATUS FOR A DISTRIBUTED CLOCK GENERATOR

(75) Inventor: Scott Fairbanks, 7 Harvey Rd, Cambridge (GB) CB1 2ET

(73) Assignee: Scott Fairbanks, Mountain View, CA (US)

( * ) Notice: Subject to any disclaimer, the term of this patent is extended or adjusted under 35 U.S.C. 154(b) by 0 days.

(21) Appl. No.: 10/726,853

(22) Filed: Dec. 2, 2003

(65) Prior Publication Data

US 2004/0108876 A1    Jun. 10, 2004

Related U.S. Application Data

(60) Provisional application No. 60/430,547, filed on Dec. 2, 2002.

(51) Int. Cl.
*G06F 1/04* (2006.01)

(52) U.S. Cl. ........................................ 327/293; 327/297

(58) Field of Classification Search ................ 327/291, 327/293, 295–297, 261, 263, 264, 269, 271, 327/272, 284, 285, 288; 331/50, 55, 57
See application file for complete search history.

(56) References Cited

U.S. PATENT DOCUMENTS

| | | | | |
|---|---|---|---|---|
| 5,592,127 A | * | 1/1997 | Mizuno ........................ | 331/57 |
| 5,640,112 A | * | 6/1997 | Goto et al. .................. | 327/141 |
| 5,712,883 A | * | 1/1998 | Miller et al. ................. | 375/371 |
| 5,883,534 A | * | 3/1999 | Kondoh et al. ............. | 327/156 |
| 5,892,373 A | * | 4/1999 | Tupuri et al. ................ | 326/97 |
| 6,037,820 A | * | 3/2000 | Ishizaka ....................... | 327/292 |
| 6,057,724 A | * | 5/2000 | Wann ........................... | 327/292 |
| 6,118,304 A | * | 9/2000 | Potter et al. ................. | 326/93 |
| 6,191,658 B1 | * | 2/2001 | Fairbanks .................... | 331/57 |
| 6,305,001 B1 | * | 10/2001 | Graef .......................... | 716/12 |
| 6,400,230 B1 | * | 6/2002 | Fairbanks .................... | 331/57 |
| 6,531,897 B1 | * | 3/2003 | Milshtein et al. ............ | 326/95 |
| 6,538,957 B1 | * | 3/2003 | Magoshi ..................... | 365/233 |

(Continued)

OTHER PUBLICATIONS

Clock Distribution Using Coupled Oscillators (pp. 217-200), I. Galton, D.A. Towne, James J. Rosenberg, H.T. Jensen, Univ. ofCA, Irvine, Harvey Mudd Col., Claremont, CA (1996).

(Continued)

*Primary Examiner*—Timothy P. Callahan
*Assistant Examiner*—Hai L. Nguyen
(74) *Attorney, Agent, or Firm*—Blakely, Sokoloff, Taylor & Zafman, LLP

(57) ABSTRACT

Methods and Apparatuses for generating and distributing a clock signal between components within a semiconductor chip. According to one embodiment of the invention, a clock generator, distributed over an integrated circuit, includes a plurality of cells each coupled to multiple adjacent ones of the plurality of cells by different clock wires; wherein, for each of the plurality of clock wires, the cell on one end generates the rising edge and the cell on the other end generates the falling edge. According to another embodiment of the invention, an integrated circuit includes a distributed clock generator and a plurality of sets of synchronous logic. The distributed clock generator includes a plurality of cells and a plurality of clock wires. The plurality of clock wires each couple together two of said plurality of cells such that said plurality of cells are coupled together in grid. The plurality of cells, responsive to a mixing of previous clock edges produced by at least certain of said plurality of cells, detect when to produce the next clock edge. The plurality of sets of synchronous logic each have a clock input. Each clock input of each of these sets is coupled to a different one of said plurality of clock wires.

38 Claims, 14 Drawing Sheets

U.S. PATENT DOCUMENTS 6,552,589 B1 * 4/2003 Masleid ............... 327/292
6,657,502 B1 * 12/2003 Bushman et al. ........... 331/57

OTHER PUBLICATIONS

Active GHz Clock Network Using Distributed PLLs (pp. 1553-1560), Vadim Gutnik, Member, IEEE and Anantha P. Chandrakasan, Member, IEEE (2000).

The Distributed Clock Generator (6 pgs) by Scott Fairbanks, Simon Moore, Computer Laboratory, University of Cambridge, UK Dec. 5, 2001.

On the Micro-Architectural Impact of Clock Distribution Using Multiple PLLs (7 pgs), Martin Saint-Lauren, Madhavan Swaminathan and James D. Meindl, Inel Corp., Austin, TX, USA, Georgia Inst. of Tech., Atlanta, GA, USA Sep. 2001.

* cited by examiner

METHOD AND APPARATUS FOR A DISTRIBUTED CLOCK GENERATOR

BACKGROUND

1. Field

Embodiments of the invention relate to the field of generating clock signals for a digital system. More specifically, the invention relates to methods and apparatuses for generating and distributing a clock signal between components within an integrated circuit.

2. Background

FIG. 10 shows what is called a Mealy machine. The Mealy machine reduces computation to an instructive abstraction. The Mealy machine shows that computation is simply the controlled updating of state (state is simply the data that records the progress of a computation) depending on the value of the current state and some inputs.

The Mealy machine illustrates four elements of computing. Most prominent is the computation cloud. In VLSI systems, computation is performed by logic gates constructed from transistors. Next is the state holding element. Traditionally state holding elements are flip-flops, although they could be latches. The third element is the clock that determines when the state holding element updates. Last is the communication represented by the wire from the output of the state holding element to the computation cloud.

The abstraction might lead one to believe that the state of the computer is located, manipulated and updated at a single physical location. Rather the state holding and computation is distributed across a large plane. Communication is not limited to a single wire, but many wires that branch and merge and form long and short channels. These realities do not disturb the model as long as each of the state holding elements receives its update signal at substantially the same time and all of the computation is completed when it is time to update to the next state. Synchronous computing evolved from this model.

Unfortunately the factors that contribute to the speed of computing have changed since the Mealy machine model was adapted. The detail that seems insignificant by the Mealy machine, communication, has grown in importance while the most emphasized property, computation, has diminished. The Mealy machine was introduced when chips were relatively small and communication costs were negligible. Clock cycles were on the order of 50–100 gate delays and slight perturbations in the clock arrival time resulted in error margins that were a fraction of a percent of the clock cycle time.

Transistor mismatches, fabrication imperfections, unstable supplies, and a host of other phenomenon make it very difficult to copy a signal to a multitude of locations over a large chip clocked in the giga-Hertz range to an accuracy that supports the Mealy model. High performance microprocessors have clocks that switch many billions of times per second. The cycle time is typically on the order of 8–10 gate delays. This high speed clock signal is copied through many millimeters of interconnect and is sometimes amplified by 20+ buffers. The skew between two copies of a signal derived through millimeters of interconnect and 20+ buffers begins to approach an 8–10 gate delay cycle time.

The synchronous paradigm is built upon the assumption that clock and data signals have determinative delays. The clock tree assumes that a signal that is buffered through physically separate yet identically designed paths produces identical signals at the end of those paths. Very little certainty exist in modern transistor processes and each new process has even less certainty than the last. Transistors and interconnect of equivalent dimensions will have different delays. These differences are no longer negligible.

Typically, the clock signal is generated at a single source and is distributed through chains of inverters of equal length to the individual latches. It is important that the clock signal arrives at each data latch at nearly the same time, so that operations that take place in one part of a circuit are properly synchronized with operations in other parts of the circuit.

However, it is impossible to match exactly the delay of all paths from the source of the clock signal to the individual latches. Cross-die processing variations and imprecision in the alignment of the fabrication equipment make this impossible. To complicate matters, die sizes are becoming larger, resulting in greater die variations and longer inverter chains, which result in greater path disparities.

As clock speeds increase, these disparities consume an increasingly larger fraction of the clock period. The disparity in the arrival time of a clock signal between latches is called "skew." Note that skew causes uncertainty about the time that data is latched. Furthermore, note that calculations cannot be performed during periods when it is not certain that the data is valid. As clock speeds increase, the skew between latches remains approximately constant. Hence, a smaller fraction of the clock period can be used for calculations.

The traditional method for distributing a clock signal is to use an H-tree topology. A square area of the integrated circuit is divided into quadrants and the centers of each quadrant are connected by an 'H' interconnect topology. Each of the three segments of the 'H' is equal to half the length of the sides of the square integrated circuit. The distance of the path from each prong to the center of the perpendicular segment, or the root, of the 'H' is equivalent. The prongs are called leaves in keeping with the tree image.

An area can be divided into 16 regions by superimposing an 'H' onto a square integrated circuit and then centering four 'H's' half the size of the initial 'H' onto the leaves of the first 'H'. A square integrated circuit can be divided into $4^n$ regions, for any power of n, by recursively applying this method. A signal applied at the root of the largest 'H' is copied to all the leaves at substantially the same time.

Note that although the path from the root to each leaf is equivalent by design, there will be some disparity between all paths due to physical irregularities and fabrication resolutions. Although each path from the root to the leaves contains interconnect of equivalent length, and gates of equivalent size and number, separate paths are only equal to the resolution of the fabrication equipment. The more the paths from root to leaf diverge, the more skew tends to accumulate.

Note that there will be a place in an H-tree system where two adjacent signals will be derived through maximally different routes through the tree. This is typically where the skew is at a maximum.

Clock skew can be compensated for by adding a timing margin to the clock cycle time. However, this added timing margin can become a significant fraction of the clock period, and can hence limit system performance.

One way to deal with this problem is to divide an integrated circuit into multiple clock domains, where each clock domain operates from an independent clock. This relieves some of the difficulty in copying a signal across a large area of silicon to arrive at separate locations at substantially the same time. However, dividing an integrated circuit into multiple independent clock domains creates problems in synchronizing communications or data transfers between the different clock domains.

Another solution is to provide larger buffers and to use less resistive interconnect in the clock distribution circuitry. This solution uses more power and causes stronger electromagnetic fields to be emitted from the clock net which is seen as noise by other signals. Power consumption and signal noise are both limiting factors for processor performance.

BRIEF SUMMARY

Methods and Apparatuses for generating and distributing a clock signal between components within a semiconductor chip are described. According to one embodiment of the invention, a clock generator, distributed over an integrated circuit, includes a plurality of cells each coupled to multiple adjacent ones of the plurality of cells by different clock wires; wherein, for each of the plurality of clock wires, the cell on one end generates the rising edge and the cell on the other end generates the falling edge. According to another embodiment of the invention, an integrated circuit includes a distributed clock generator and a plurality of sets of synchronous logic. The distributed clock generator includes a plurality of cells and a plurality of clock wires. The plurality of clock wires each couple together two of said plurality of cells such that said plurality of cells are coupled together in grid. The plurality of cells, responsive to a mixing of previous clock edges produced by at least certain of said plurality of cells, detect when to produce the next clock edge. The plurality of sets of synchronous logic each have a clock input. Each clock input of each of these sets is coupled to a different one of said plurality of clock wires.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1A:
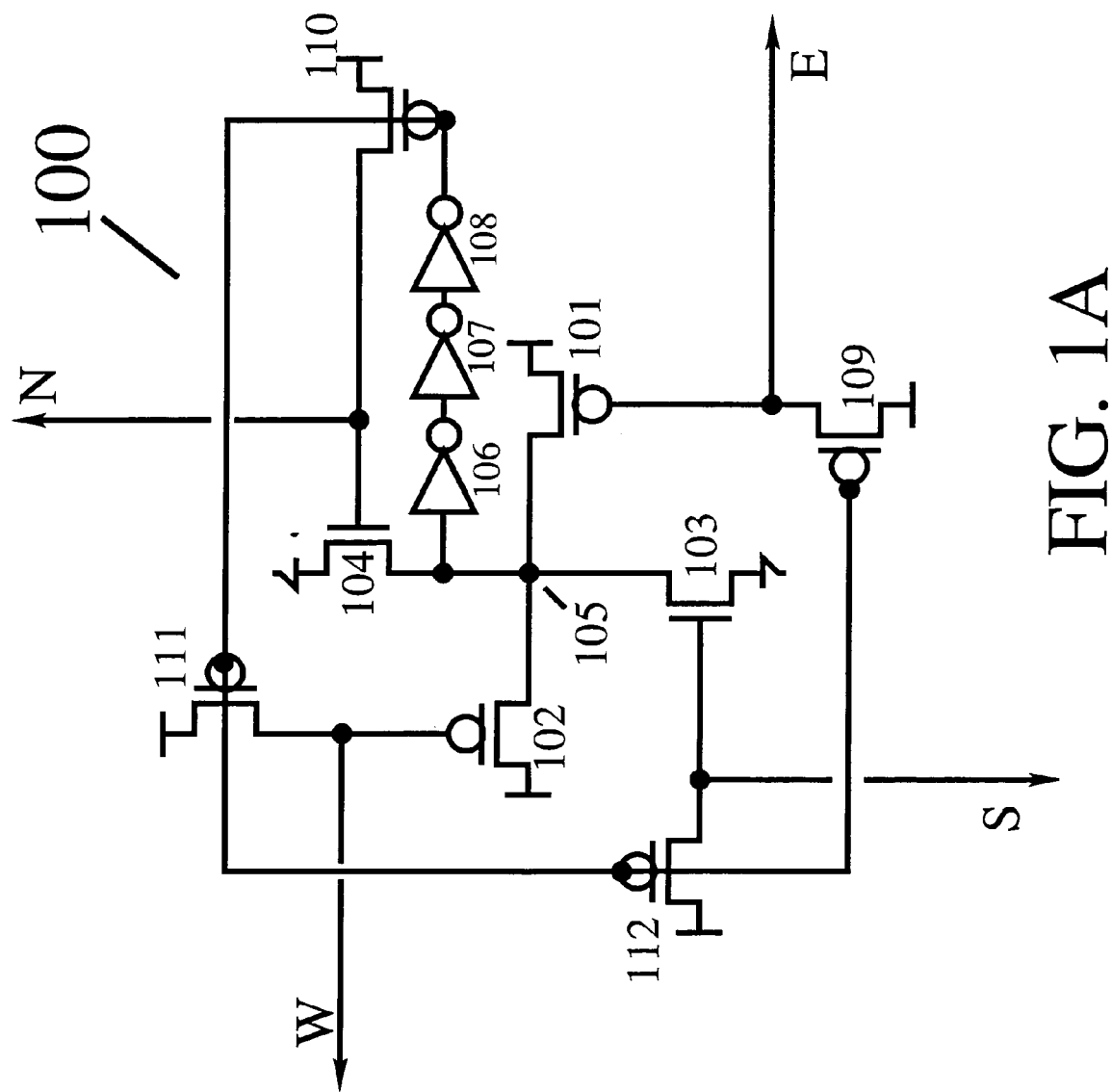
FIG. 1A illustrates a pull-up cell in accordance with an embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Thus, various modifications to the disclosed embodiments are apparent, and the general principles defined herein may be applied to other embodiments and applications without departing from the spirit and scope of the invention. Thus, the invention is not intended to be limited to the embodiments shown, but is to be accorded the widest scope consistent with the principles and features disclosed herein.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. Rather, in particular embodiments, "connected" be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

The data structures and code (e.g., that specify the layout of an integrated circuit including the invention, that produces data structures and code that specify the layout of an integrated circuit including the invention, etc.) are typically stored on a machine-readable storage medium. A machine-readable medium includes any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Overview

Methods and Apparatuses for generating and distributing a clock signal between components within a semiconductor chip are described. Embodiments of the invention rely upon asynchronous type detection techniques. Events, such as the generation of a falling/rising clock edge, are only initiated after other events are detected, such as a rising/falling clock edge. Rather than rely upon a single detected falling/rising clock edge to determine when the rising/falling clock edge is triggered, embodiments of the invention rely upon the detection of a plurality of falling/rising clock edges and triggers the rising/falling clock edge based upon their arrival times. It is assumed that each signal detected is intended to operate at the same phase and frequency, just as the different leafs in a clock tree operate.

Figure 9:
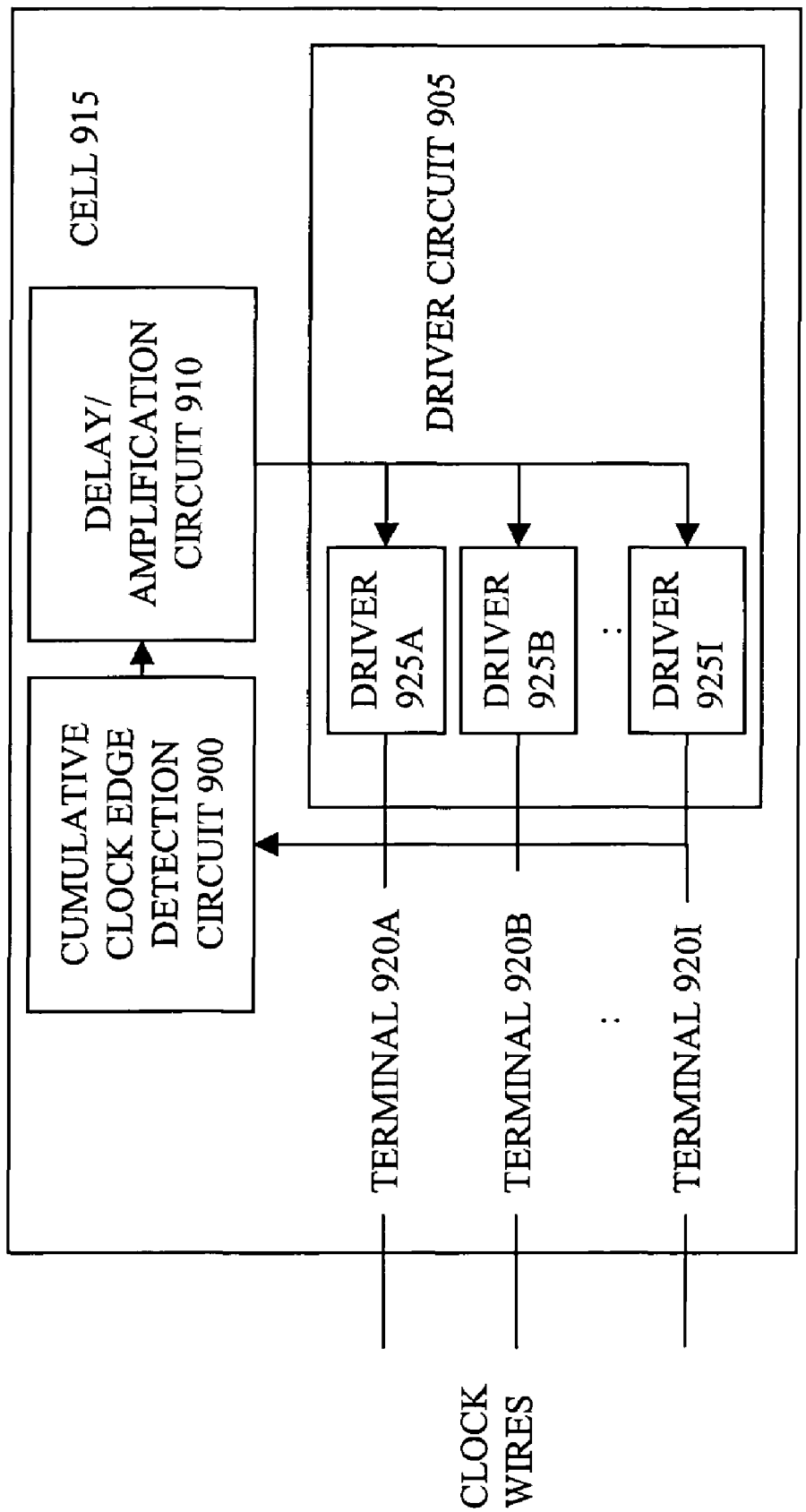
FIG. 9 is a block diagram illustrating a cell according to embodiment of the invention.
Figure 10:
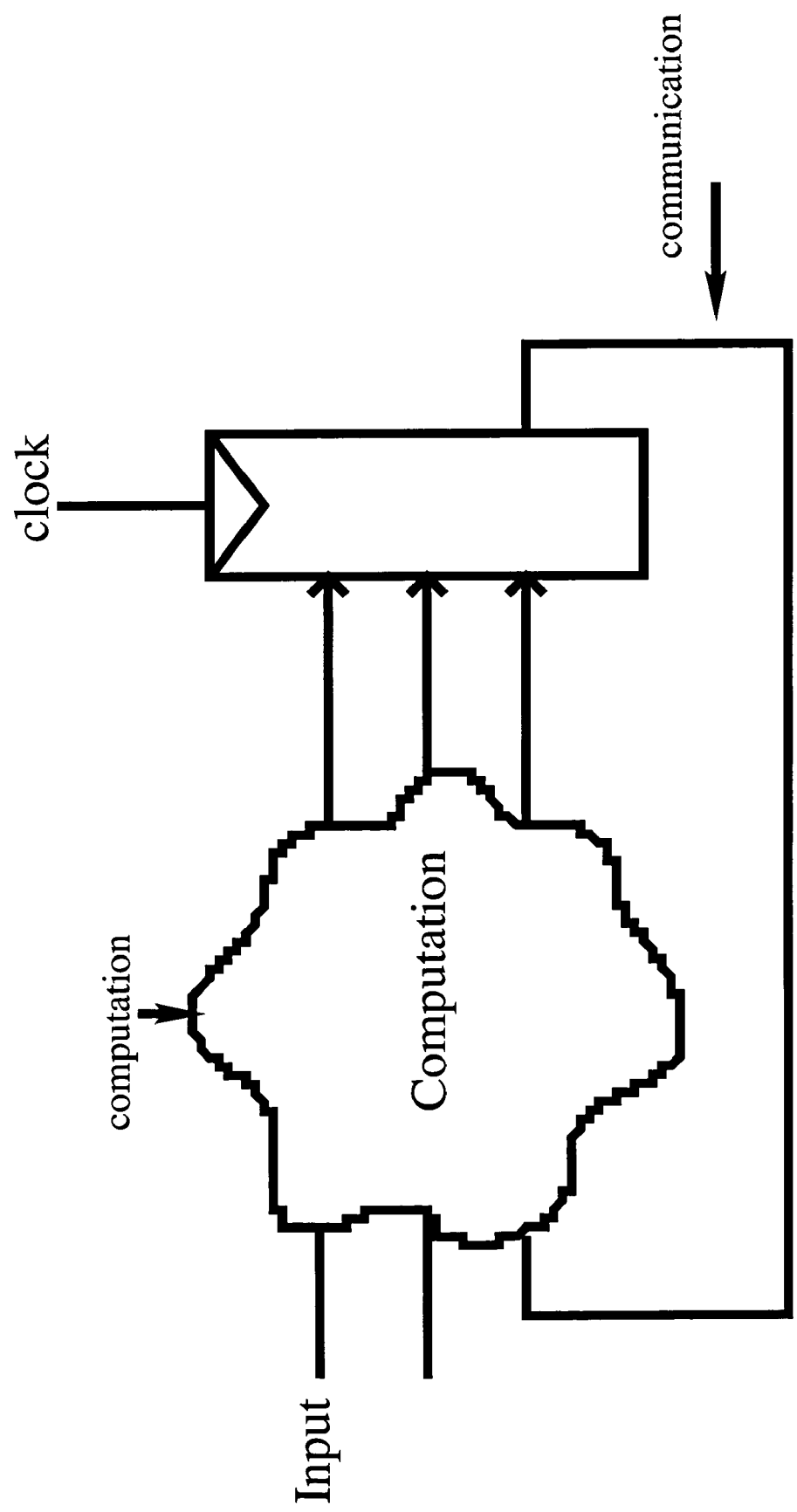
FIG.10 illustrates a Mealy Machine.

FIG. 9 is a block diagram illustrating a cell according to embodiment of the invention. The cell includes: 1) a cumulative clock edge detection circuit, 900, detects a mixed phase of the clock signals carried on a plurality of wires; 2) a driver circuit 905, including drivers 925A–I, returns the voltage on the plurality of wires coupled to the terminals, 920A–I, of the cumulative clock edge detection circuit to the complementary binary voltage at substantially the same time; 3) an amplification/delay circuit, 910, that takes the signal produced by the cumulative clock edge detection circuit and delays and amplifies it to drive the driving circuit.

The phase mixing of the cumulative clock edge detection circuit reacts to the possibly differing arrival times of the clock edges by determining a moment in time for the cumulative clock edge detection circuit's single output clock edge transition. Thus, the moment in time for the cumulative clock edge detection circuit's single output clock edge transition that is reflective of the input clock edge transitions. In particular, the mixed phase becomes an average phase when the difference in the arrival times of the clock edges are within a period of time roughly equivalent to the rise/fall time of the clock signal. If the arrival times are substantially longer than this, then this circuit no longer averages phase but responds in a time that is a non-linear function of the input phases. The synchronization behavior of the cell is retained regardless.

The terminals to a cell coincide with the terminals to the cumulative clock edge detection circuit. A number of cells are coupled in a grid topology (e.g., a rectangular two-dimensional grid topology) over the area of the integrated circuit to be clocked by the distributed clock generator. The cells are coupled by relatively long wires that initiate and terminate at these terminals. The signals on this collection of long wires are copies of the clock signal. A useful number for the choice of terminals to the cells is four. This number allows you to position the four terminals 90 degrees apart from each other on the periphery of the cell. Manhattan routing methods, standard cell design, and power grid distribution apparatus typically impose regular rectangular geometries. The rectangular grid clocking topology is easily integrated into a typical VLSI chip because they use these structures and techniques. However, alternative numbers of terminals per cell, routing methods, cell designs, and/or power grid distribution apparatus can be used.

The cumulative clock edge detection circuit initiates an event when the mixed phase of a plurality of signals on the terminals to the cumulative clock edge detection circuit has a voltage transition. In certain embodiments, once the mixed phase of the arrival time of a clock edge on the plurality of wires is detected, a transition is generated in the opposite direction on the detected wires. This second edge is enacted by the driver circuit. The driver circuit contains one driver for each of the detected wires. Each of these drivers is triggered by the same event. Because the drivers are triggered by the same event, the enacted clock edge on the plurality of wires will be synchronized on that edge. Even though the, say, falling edges might arrive to the cumulative clock edge detection circuit out of phase with respect to each other, their rising edges will then be in phase with each other.

As stated above, the cumulative clock edge detection circuit generates an event that signals a transition on the plurality of its terminals. This transition signal is delayed and amplified by the delay/amplification circuit to drive the driver circuit. Embodiments in which the cumulative clock edge detection circuit is implemented using small transistors (e.g., so that the clock signals are not heavily loaded) and the driver circuit is implemented using larger transistors (e.g., to drive long wires that traverse a significant fraction of the integrated circuit), the delay/amplification circuits provides the needed amplification. Because the cycle time of the clock that is generated and distributed is determined by the delay of the gates within the cells, the delay/amplification circuit provides the proper delay to give a proper duration to the clock period. The longer the delay, the longer a HI or LO voltage on the clock wires will remain before being transitioned to the opposite value. This delay can be fixed or tunable depending on implementation.

In this manner, embodiments of the invention generate and distribute the clock signal so that synchronous circuit elements (including state holding elements such as latches, flip-flops, etc.) at different locations on the semiconductor chip remain properly synchronized (e.g., even at relatively high clock speeds). In addition, embodiments of the invention are implemented to be relatively efficient with respect to space, componentry and power. Also, embodiments of the invention can be implemented to not be excessively noisy.

Two Cell Type Embodiments

One embodiment of this invention uses two varieties of cells: pull-up cells and pull-down cells. The two types of cells alternate like the red and black squares on a checkerboard. The interior cells are coupled to four cells of the complementary type by relatively long wires. The signal on the wires coupling the two types of cells are different copies of the logical clock signal. The pull-up cells are responsible for charging the clock wires to a high voltage. The pull-down cells are responsible for discharging the clock wires to a low voltage.

Pull-Up Cell

FIG. 1A illustrates a pull-up cell 100 in accordance with an embodiment of the invention. Pull-up cell 100 includes four terminals N, S, E and W that are coupled to wires that carry the clock signal. The cell is constructed from a cumulative clock edge detection circuit, an amplification/delay circuit and a driver circuit. The cumulative clock edge detection circuit includes four transistors, two PMOS 101 and 102 and two NMOS 103 and 104. The gates of PMOS transistors 101 and 102 are coupled to terminals 100.E and 100.W, respectively. The gates of NMOS transistors 103 and 104 are coupled to terminals 100.S and 100.N, respectively. The sources of the PMOS transistors are coupled to the positive supply voltage. The sources of the NMOS transistors are coupled to the ground or negative supply voltage. The drains of the four transistors 101, 102, 103 and 104 are shorted together (forming node 105) to mix the phase of clock signals at the terminals. Node 105 is pulled to a HI voltage when the mix of the voltages on the terminals of the cell is LO. Likewise node 105 is pulled to a LO voltage when the mix of the voltages on the terminals of the cell is HI. Transistors 101, 102, 103, and 104 along with node 105, where the transistor drains short, form the cumulative clock edge detection circuit to this cell. Node 105 is the output of the cumulative clock edge detection circuit; while the coupling of the terminals to the gates of transistors 101, 102, 103 and 104 form the inputs to the cumulative clock edge detection circuit. Node 105 is coupled to the input of inverter 106. Inverters 106, 107, and 108 form the amplification/delay circuit, while four PMOS transistors 109, 110, 111, and 112 form the driver circuit. Series inverters 106, 107, and 108 amplify and delay the signal on node 105 to drive a node (referred to as the driver node and is the input of the driver circuit) formed by the shorted gates of PMOS transistors 109, 110, 111, and 112 (to cause them all to cause the next clock transition at substantially the same time). The sources of the drive transistors are coupled to the positive supply, while the drains are each coupled to a different one of the terminals (the drains of PMOS transistors 109, 110, 111, and 112 are respectively coupled to the terminals 100.E, 100.N, 100.W, and 100.S). These drive transistors synchronize the rising transitions on the four clock wires by simultaneously charging them. Thus, the output of the cumulative clock edge detection circuit is coupled to the input of the amplification/delay circuit, the output of the amplification/delay circuit is coupled to the input of the driver circuit, the output of the driver circuit is coupled to the four terminals, and the input of the cumulative clock edge detection circuit is coupled to the four terminals.

Figure 1B:
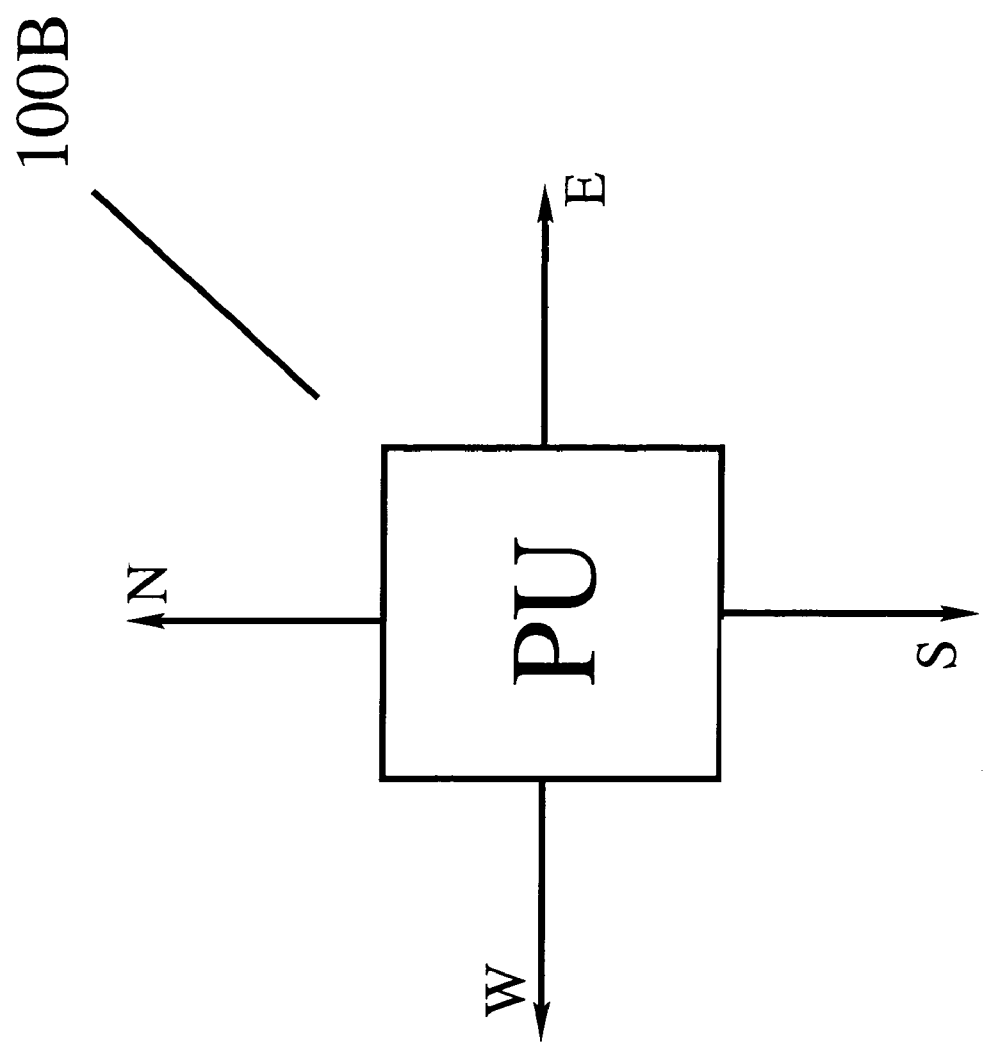
FIG. 1B illustrates another representation of the pull-up cell in accordance with an embodiment of the invention.

FIG. 1B illustrates a simplified symbolic representation of pull-up cell 100 in accordance with an embodiment of the invention. FIG. 1B represents the pull-up cell as a box labelled PU with the N, S, E, and W terminals coming out.

Pull-Down Cell

Figure 2A:
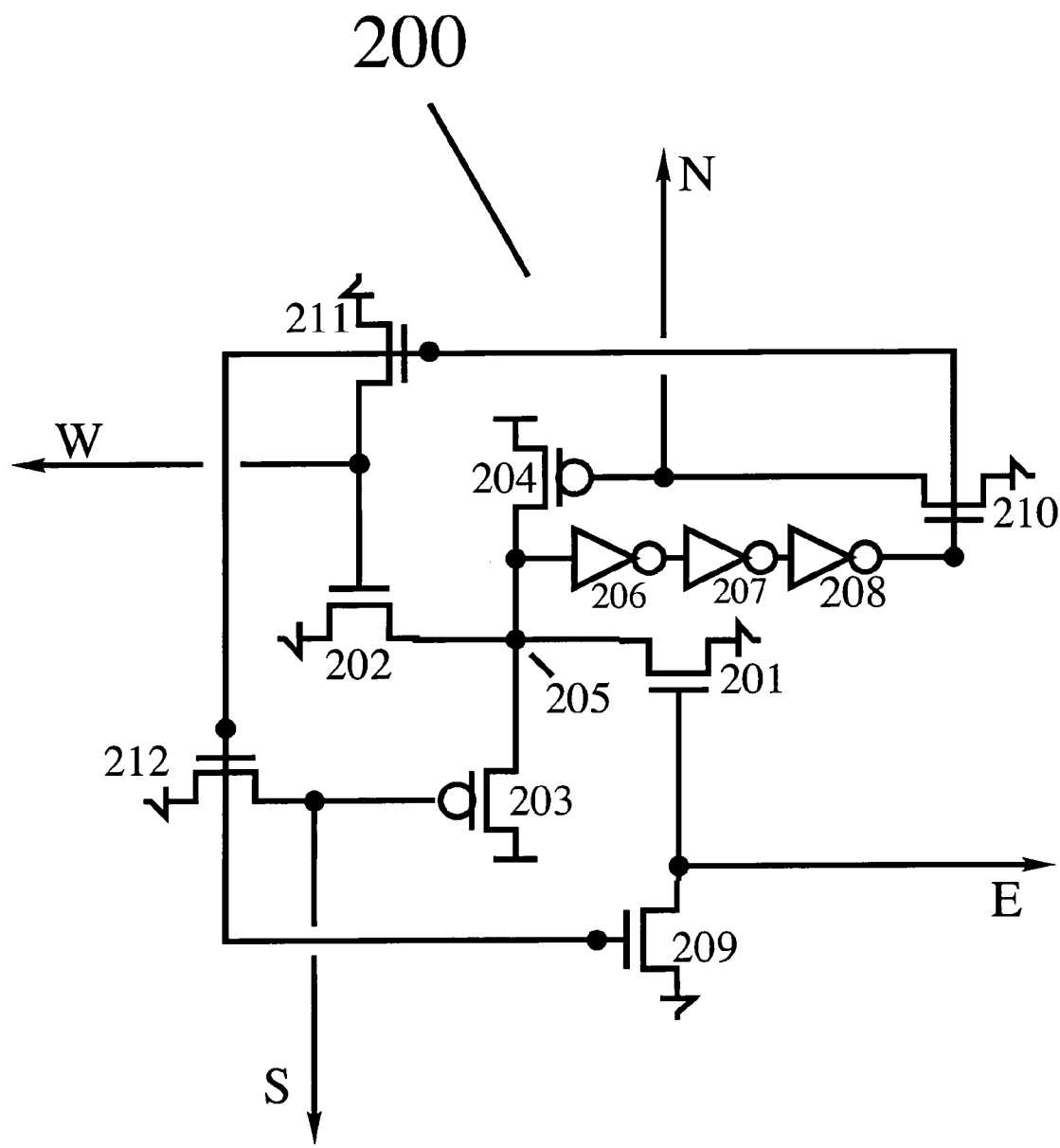
FIG. 2A illustrates a pull-down cell in accordance with an embodiment of the invention.

FIG. 2A illustrates a pull-down cell 200 in accordance with an embodiment of the invention. Pull-down cell 200 includes four terminals N, S, E and W that are coupled to wires that carry the clock signal. The cell is constructed from a cumulative clock edge detection circuit, an amplification/delay circuit and a driver circuit. The cumulative clock edge detection circuit includes four transistors, two PMOS 204 and 203 and two NMOS 201 and 202. The gates of NMOS transistors 201 and 202 are coupled to terminals 200.E and 200.W, respectively. The gates of PMOS transistors 203 and 204 are coupled to terminals 200.S and 200.N, respectively. The sources of the PMOS transistors are coupled to the positive supply voltage. The sources of the NMOS transistors are coupled to the ground or negative supply voltage. The drains of the four transistors 201, 202, 203 and 204 are shorted together to form node 205. Node 205 is pulled to a HI voltage when the mix of the voltages on the terminals of the cell is LO. Likewise node 205 is pulled to a LO voltage when the mix of the voltages on the terminals of the cell is HI. Transistors 201, 202, 203, and 204 along with node 205, where their drains short, form the cumulative clock edge detection circuit to this cell. Node 205 is the output of the cumulative clock edge detection circuit; while the coupling of the terminals to the gates of transistors 201, 202, 203 and 204 form the inputs to the cumulative clock edge detection circuit. Node 205 is coupled to the input of inverter 206. Inverters 206, 207, and 208, form the amplification/delay circuit; while four NMOS transistors 209, 210, 211, and 212, form the driver circuit. Series inverters 206, 207, and 208 amplify and delay the signal on node 205 to drive a node (referred to as the driver node and is the input of the driver circuit) formed by the shorted gates of NMOS drive transistors 209, 210, 211, and 212 (to cause them all to cause the next clock transition at substantially the same time). The sources of the drive transistors are coupled to ground or the negative supply, while the drains are each coupled to a different one of the terminals (the drains of NMOS transistors 209, 210, 211, and 212 are respectively coupled to the terminals 200.E, 200.N, 200.W, and 200.S). These drive transistors synchronize the falling transitions on the four clock wires by simultaneously discharging them. Thus, the output of the cumulative clock edge detection circuit is coupled to the input of the amplification/delay circuit, the output of the amplification/delay circuit is coupled to the input of the driver circuit, the output of the driver circuit is coupled to the four terminals, and the input of the cumulative clock edge detection circuit is coupled to the four terminals.

Figure 2B:
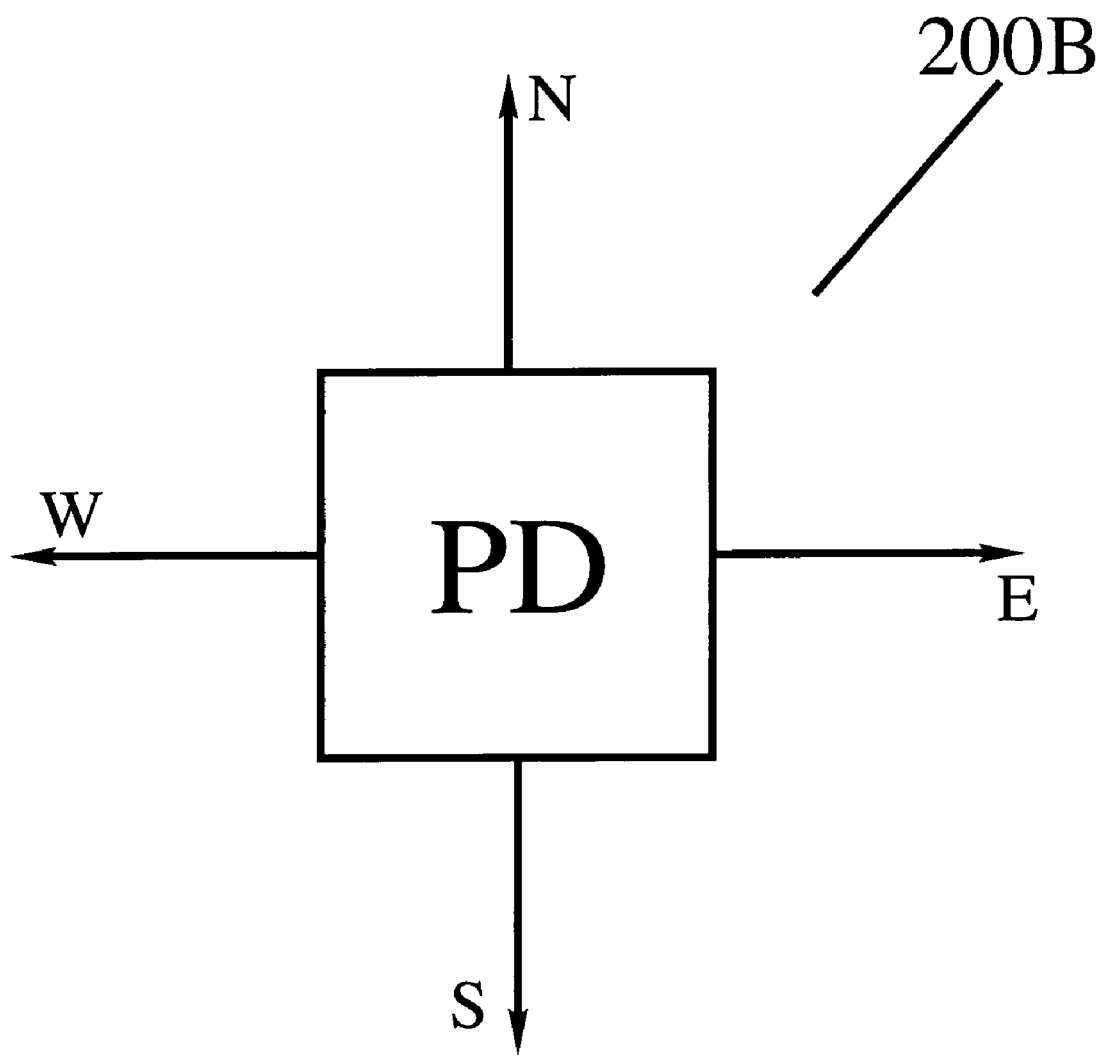
FIG. 2B illustrates another representation of the pull-down cell in accordance with an embodiment of the invention.

FIG. 2B illustrates a simplified symbolic representation of discharging cell 200 in accordance with an embodiment of the invention. FIG. 2B represents the pull-down cell as a box labelled PD with the N, S, E, and W terminals coming out.

In another embodiment of the invention, the cumulative clock edge detection circuit in cells 100 and 200 includes four inverters in place of the transistors. The input to each inverter is coupled to one of the cell's terminals and the outputs of the inverters are shorted together. The node formed by the shorted output of the inverters is the output of the cumulative clock edge detection circuit.

In another embodiment of the invention, the inverters in the amplification/delay circuit are embodied with variable delay inverters. This allows the clock period to be tuned.

Two-dimensional Grid of Pull-Up and Pull-Down Cells

Figure 3:
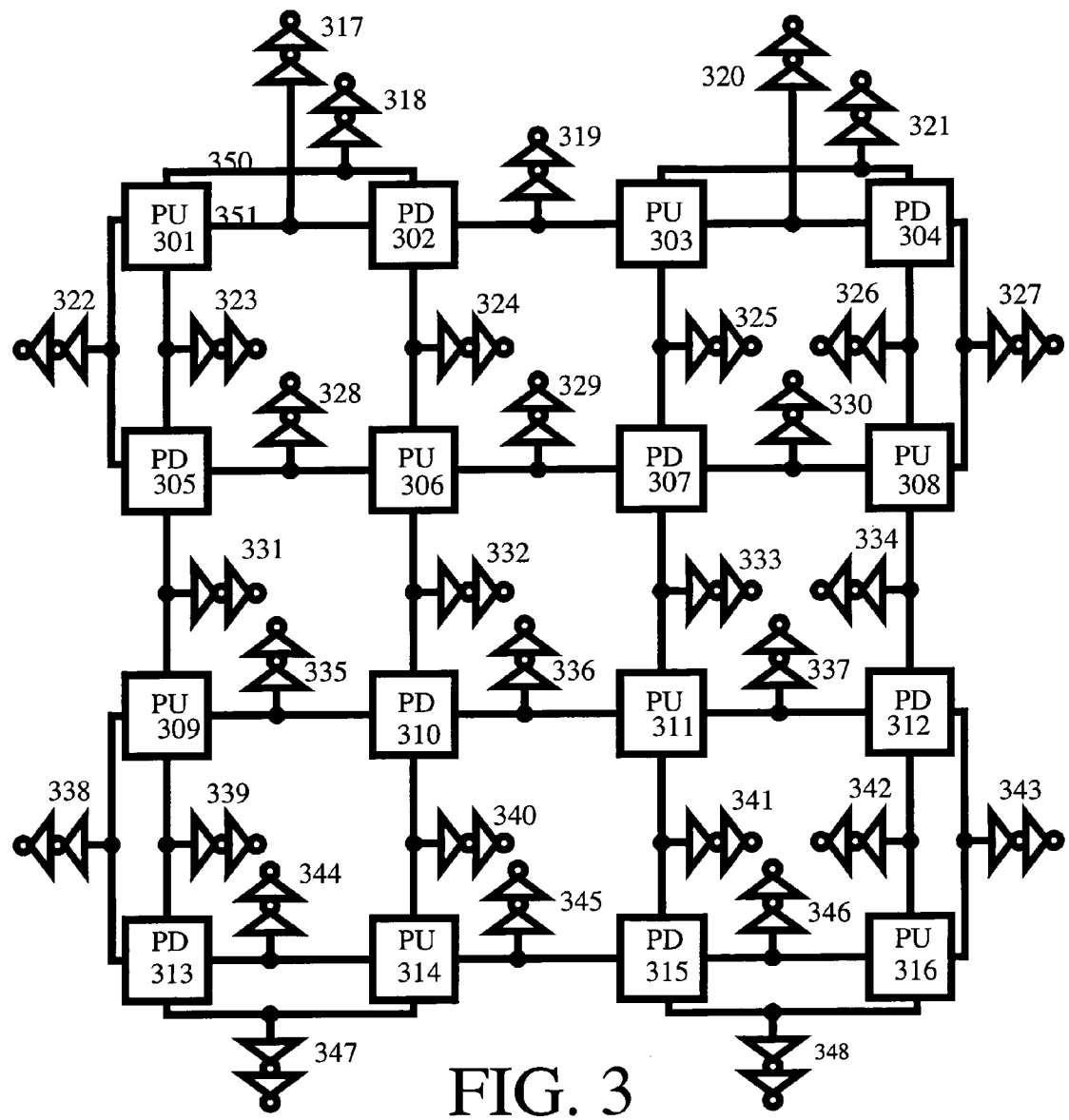
FIG. 3 illustrates how cells are coupled together into a two dimensional grid in accordance with an embodiment of the invention.

FIG. 3 illustrates how pull-up and pull-down cells, 100 and 200, are coupled together into a two-dimensional grid in accordance with an embodiment of the invention. Grid 300 comprises cells 301–316, which are coupled together through a number of wires to neighboring cells as is illustrated in FIG. 3. Each column and row of cells alternates between pull-up and pull-down cells. This grid contains four rows and four columns although any even number of columns and rows is possible. Amplifiers having two series inverters, 317–348, are driven by the each of the clock wires that couple the cells. Each of these amplifiers in turn are used to drive synchronous logic (e.g., each amplifier could be used to drive a different set of synchronous logic in proximity to that amplifier on the integrated circuit, which the different sets of synchronous logic can be interconnected as they receive the same clock signal). These amplifiers serve two functions. They insulate the clock generation and distribution system from the electronics of the latches and they provide extra amplification to drive the clock inputs of the latches. Two inverters is a sensible number of inverters but in practice any number, including zero, could be used.

In one embodiment of the invention, the cells in the corners of the two dimensional grid, 301, 304, 313 and 316, are coupled to only two other cells with wires that carry the clock signal. Instead of coupling to the other cells with a single wire through a single terminal, the corner cells couple to the other cells with two wires that each are coupled through a single terminal.

The cells that are on the sides of the two dimensional grid but not in the corners, 302, 303, 305, 308, 309, 312, 314, and 315, are coupled to only three other cells. Two of those cells will be on the same side of the grid and will couple through either one or two clock wires—in other words, the cells sharing the same side of the grid connect their extra terminal to the extra terminal of the adjacent cell of the complementary type.

In another embodiment, multiple wires that are running between the same cells are merged, for example 350 and 351.

Note that the dimensions of the grid, 4×4, are arbitrary. The apparatus described scales to any size as long as the columns and rows are even. A third dimension may also be added should integrated circuit technology progress to allow it.

Figure 4:
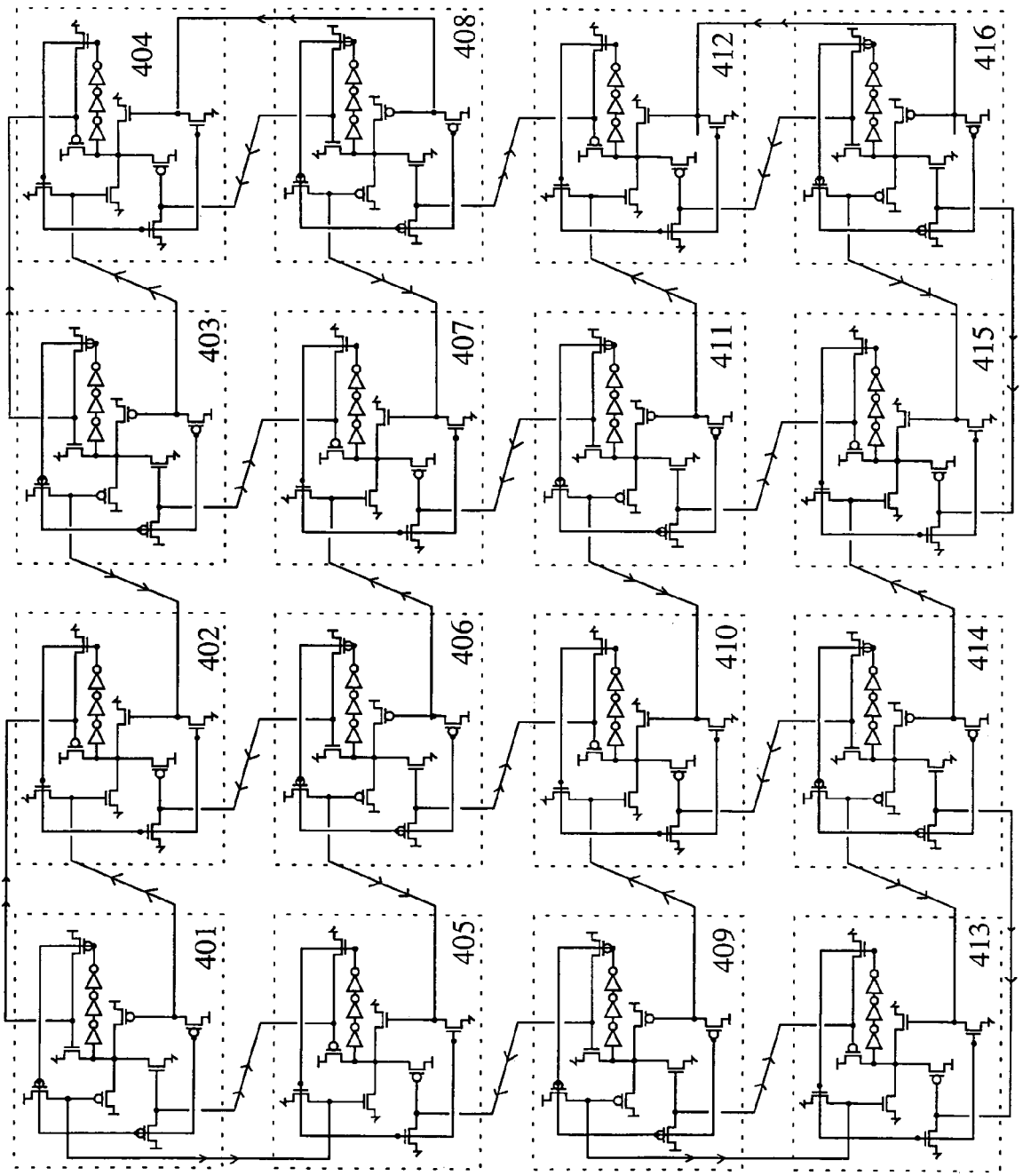
FIG. 4 provides a more-detailed illustration of the grid of cells from FIG. 3 in accordance with an embodiment of the invention.

FIG. 4 provides a more-detailed illustration of the grid of cells 300 illustrated in FIG. 3 in accordance with an embodiment of the invention. The inverters coupled to the clock lines are omitted to reduce clutter. Arrows are placed on the wires showing the direction of current flow (out of terminals of the pull-up cells and into terminals of the pull-down cells; or put another way, from drains of pull-up drive transistors to drains of pull-down drive transistors). Wires are shown running at an angle. On the integrated circuit, these wires are likely straight and are proportionally much longer than shown. The cells 401–416 consume a much smaller proportion of space on an actual integrated circuit but are drawn large to amplify details.

Note that all of the clock wires in FIG. 4 are designed to operate at the same frequency and phase. The rising transition on each clock wire is synchronized with three other clock wires by the same pull-up cell. Similarly, the falling transition on each clock wire is synchronized with three other clock wires by the same pull-down cell. Note that no two clock wires are charged and discharged by the same two cells except for the clock wires along the sides and in the corners of a grid.

Figure 5:
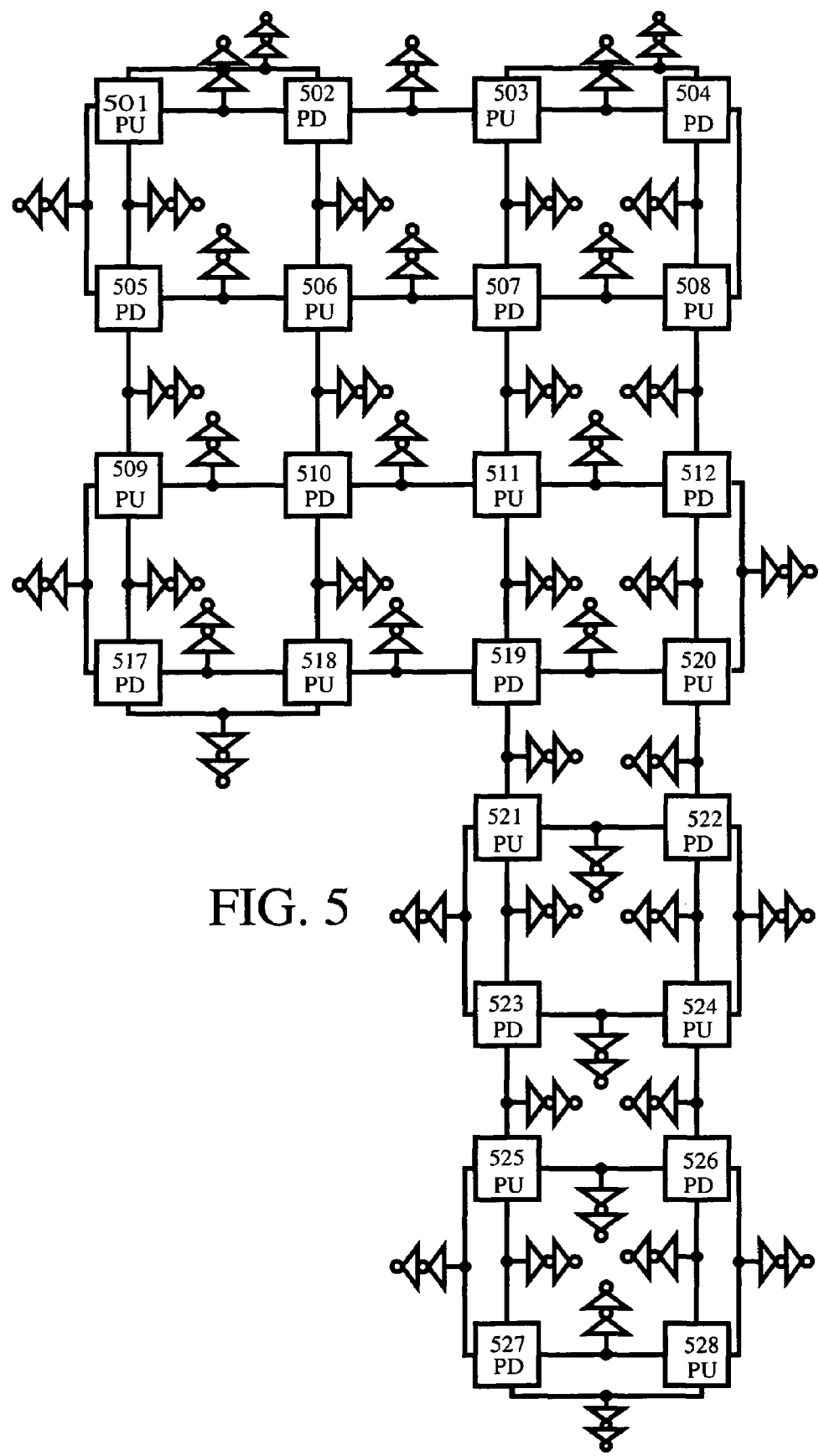
FIG. 5 illustrates how cells can be combined into an L-shaped grid in accordance with an embodiment of the invention.

FIG. 5 provides an example of how the cells can be arranged to accommodate integrated circuits of irregular shapes. In particular, the grid of cells in FIG. 5 is not rectangular, but is a square with a rectangular extending towards the bottom. It should be understood that any shape is within the scope of the invention.

The duty cycle of the clock in embodiments using the pull-up and pull-down cells can be controlled in two ways. First, the relative delays of the pull-up and pull-down cells can be varied. The longer the delay of the pull-up cell is relative to the pull-down cell, the longer the duty cycle will be. Second, the end of the clock wire that is coupled to the pull-up cell charges to a high voltage before, and discharges to a low voltage after, the end of the clock wire coupled to the pull-down cell. In other words, the duty cycle is longer on the wire near the pull-up cell. The 50% duty cycle point is near the center of the wire. The duty cycle variation of the wire depends on the resistance and capacitance properties of the wire. Thus, the duty cycle of the signal used to drive the synchronous logic is dependent on where along the wire the signal is tapped. The duty cycle is greatest at the drain of the pull-up drive transistor in the pull-up cell and least at the drain of the pull-down drive transistor in the pull-down cell. The amount of variation depends on the RC time constant of the wire and the fraction of the RC constant contributed by resistance.

Hybrid Cell Embodiments

Figure 6:
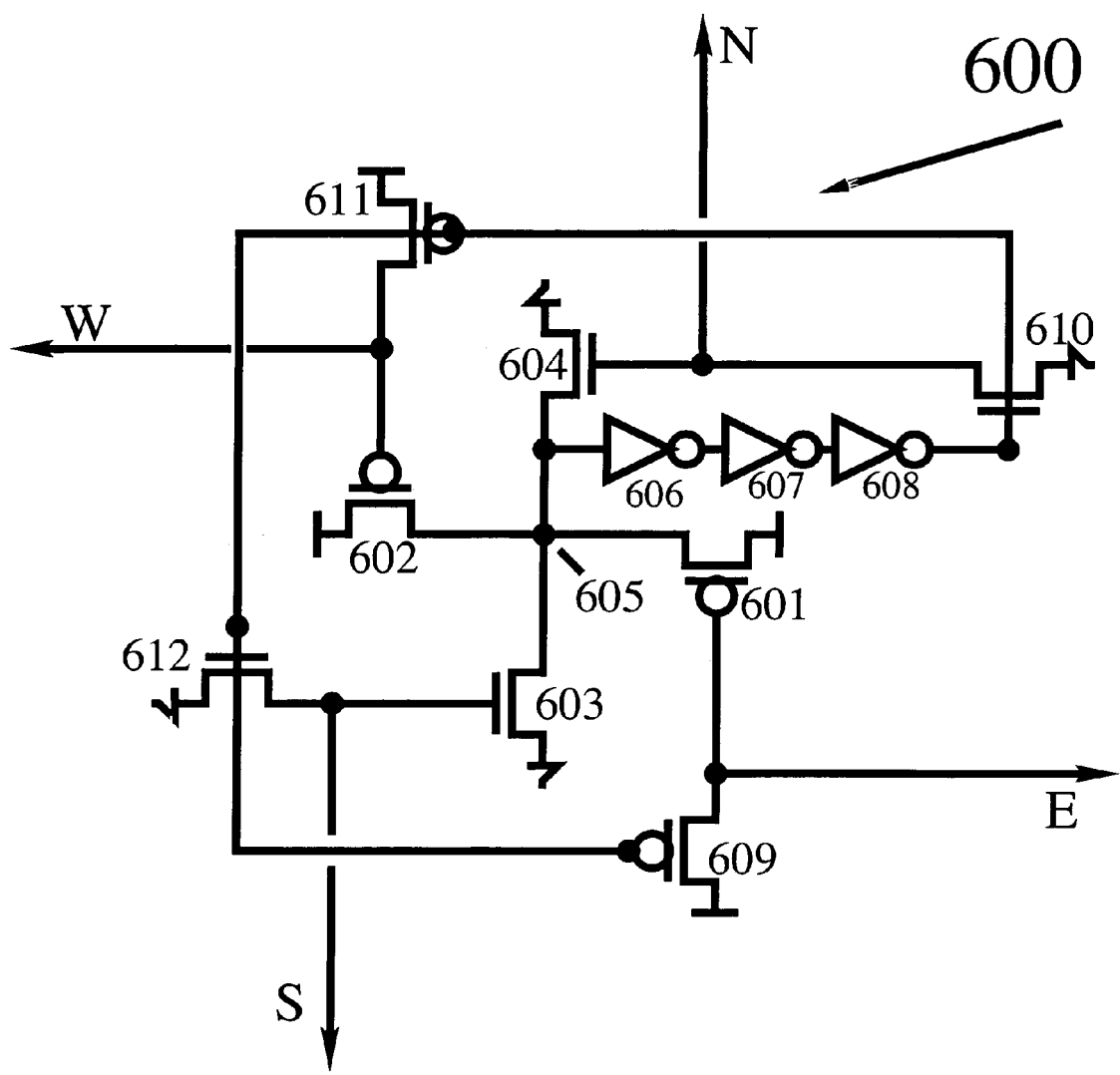
FIG. 6 illustrates a hybrid pull-up/pull-down cell in accordance with an embodiment of the invention.

FIG. 6 illustrates a hybrid cell according to one embodiment of the invention. It includes three parts: the cumulative clock edge detection circuit, the amplification/delay circuit, and the driver circuit. The cumulative clock edge detection circuit and amplification/delay circuit are identical to those used in 100 and 200. The driver circuit includes two NMOS transistors, 610 and 612, and two PMOS transistors, 609 and 611. The sources of the NMOS drive transistors are coupled to the negative supply or ground. The sources of the PMOS drive transistors are coupled to the positive supply voltage. The drains of the four driving transistors are each coupled to a different one of the terminals (the drains of driving transistors 609, 610, 611, and 612 are respectively coupled to the terminals 600.E, 600.N, 600.W, and 600.S). The gates of the four driving transistors are shorted together. In this case each cell's driver is divided into a pull-up and a pull-down part. Each voltage transition at the input to this driver circuit will make two transistors non-conductive and two transistors conductive. If a terminal to the cell is coupled to the drain of a pull-up drive transistor, for example 600.W or 600.E, then the other end of the clock wire coupled to this terminal will be coupled to a terminal with a pull-down drive transistor.

Figure 7:
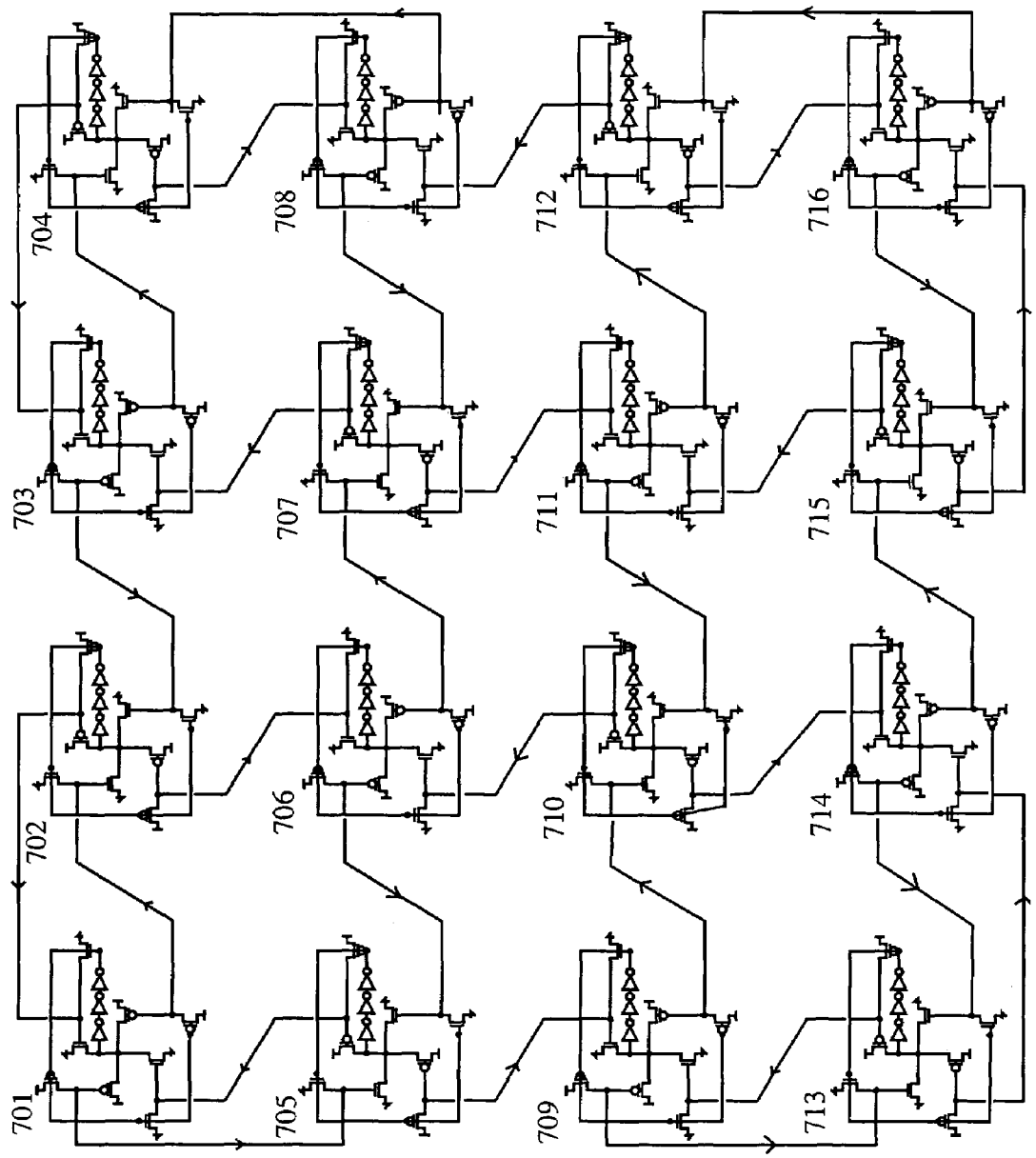
FIG. 7 illustrates how the cells of FIG. 6 are coupled together in a two-dimensional grid in accordance with an embodiment of the invention.

FIG. 7 provides a detailed illustration of how cell 600 is coupled to make a clock distribution apparatus in accordance with one embodiment of the invention. FIG. 7 contains 16 copies of circuit 600. Each copy is rotated 90 degrees from its four neighbors. This ensures that each clock wire that connects cells is coupled to a terminal with a pull-up transistor as well as a terminal with a pull-down transistor. Arrows are placed on the wires showing the direction of current flow (from terminals with pull-up drive transistors to terminals with pull-down drive transistors). While FIG. 7 illustrates a square grid, alternative embodiments have grids of other shapes in a similar manner previously described above. In addition, the amplifiers on the clock wires have been omitted to avoid clutter.

Operation

The frequency of the clock generation and distribution system described is determined by the delays of the gates within the cells. For example, the cells used in the clock distribution apparatus shown in FIG. 4 have 5 gate delays each (see the five gate delays encountered in pull-up cell 100 from terminal 100.N are the delays in gates 104,106,107,108 and 110), and therefore the clock that results will have a period of 10 gate delays (5 from the pull-up cells and 5 from the pull-down cells). This is a relatively aggressive clock. The clock speed can be controlled by: 1) including more or less inverters in the delay/amplification circuit; and/or 2) replacing all or some of the simple inverters in the delay/amplification circuit (e.g., 106–108 and 206–208 found in FIG. 1A and FIG. 2A) with inverters that have a variable delay.

Figure 8A:
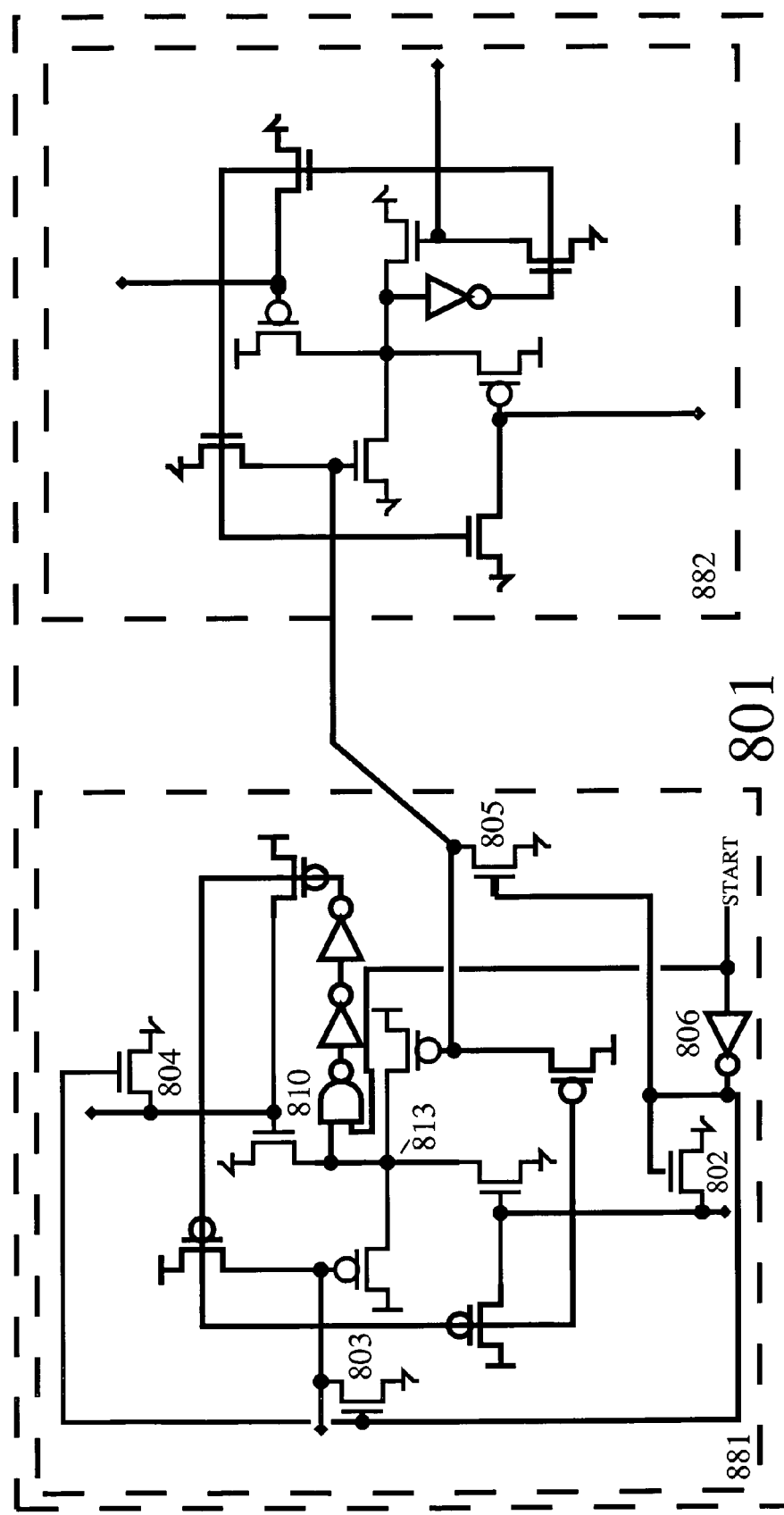
FIG. 8A is a circuit fragment illustrating the initialization of the clocking signal until stabilization according to one embodiment of the invention.

FIG. 8A is a circuit fragment illustrating the initialization of the clocking signal until stabilization according to one embodiment of the invention. Circuit 881 is identical to the circuitry found in cell 100 except for some additional circuitry and one modification. The additional circuitry includes a START signal, an initialization inverter, 806, and four initialization transistors, pull-down transistor 802–805. The modification is that inverter 106 in cell 100 is changed to a NAND gate 810. For clarity, the node 105 has been re-labeled 813.

The inputs of the NAND gate 810 are coupled to the node 813 and the START signal. The input to the initialization inverter 806 is coupled to receive the START signal. The output of the initialization inverter 806 is coupled to the gates of the pull-down transistors 802–805. The sources of the pull-down transistors 802–805 are coupled to ground or negative voltage. Each of the drains of the pull-down transistors 802–805 is coupled to a different one of the terminals (the drains of pull-down transistors 802–805 are respectively coupled to the terminals 100.S, 100.W, 100.N, and 100.E). When the START signal is applied LO, the pull-down transistors initialize and hold the clock wires LO. When the START signal is applied LO the output of the NAND gate is HI and the input to the driving circuit of cell 881 is also HI. This driving circuit is not able to generate a clock edge on the terminals when its input is HI.

Figure 8B:
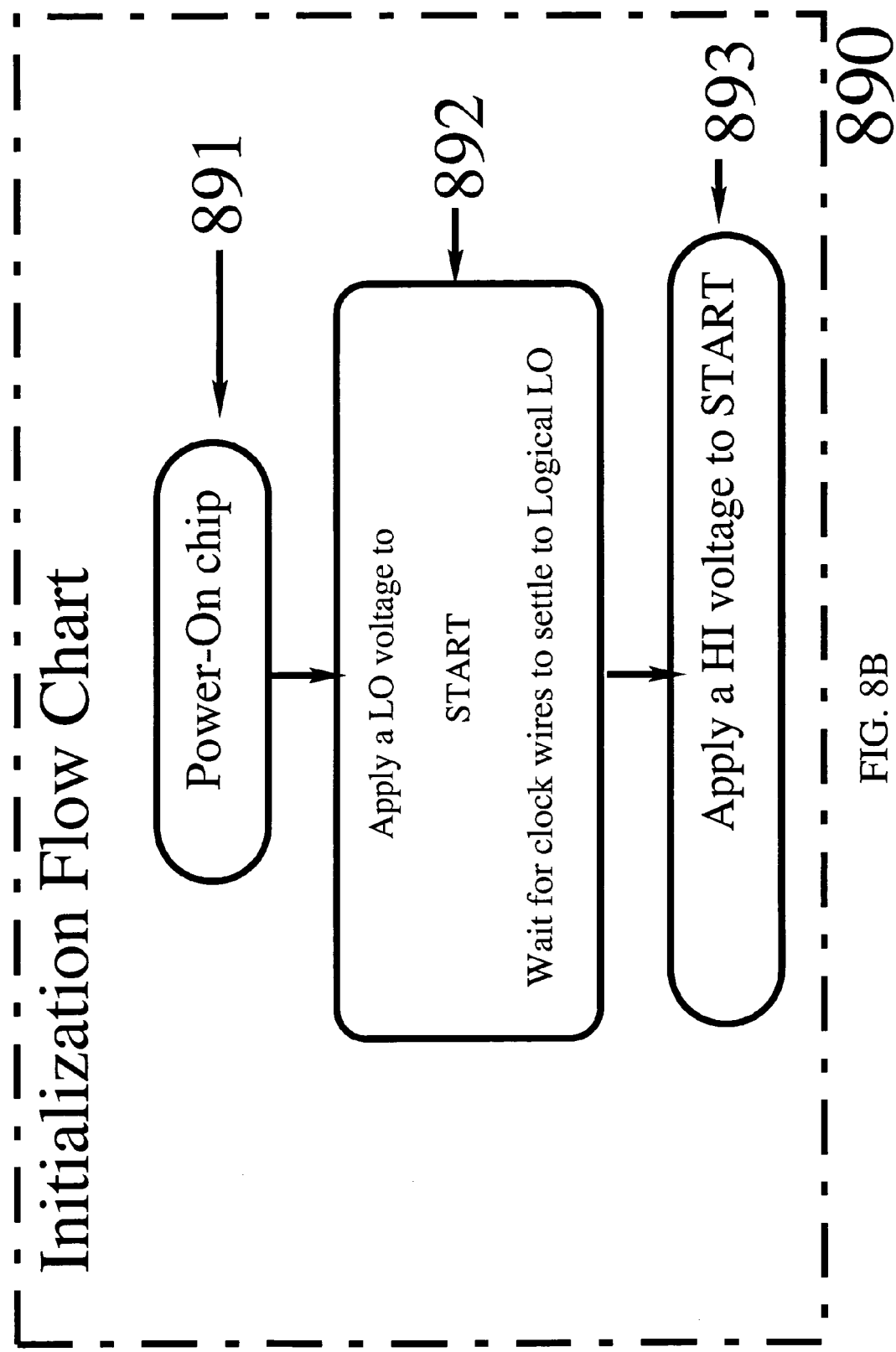
FIG. 8B is a flow diagram illustrating the initialization procedure according to one embodiment of the invention.

FIG. 8B is a flow diagram illustrating the initialization procedure according to one embodiment of the invention. In block 891, power is supplied to the chip. In block 892, the START signal is applied LO until the clock wires settle to logical LO. This allows the system to reach a stabilized state to ensure proper starting of the clock. In block 893, the START signal is applied HI. The application of the START signal HI causes the clock to start to function.

In another embodiment of invention, rather than initializing the clock with the pull-up cells, the pull-down cells are used. In this embodiment, all of the clock wires are initialized HI by using circuits that are complementary to that found in FIG. 8A. Instead of pull-down transistors, pull-up transistors are used. A NOR gate replaces inverter 206 in circuit 200. The START signal is initially HI until all nodes settle to a logic 1. Then the START signal is applied LO to start the clock distribution network oscillating.

Figure 8C:
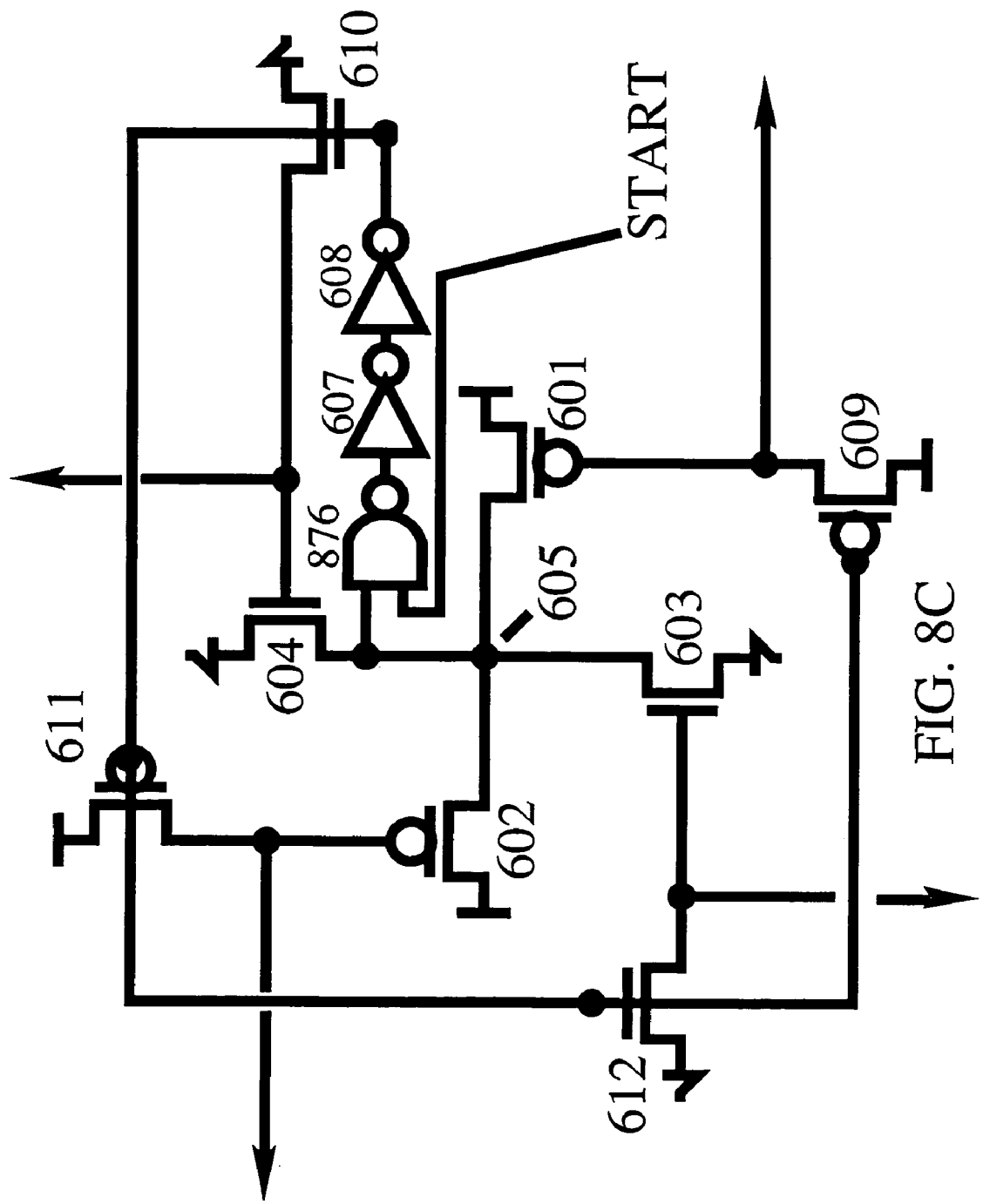
FIG. 8C illustrates circuit 600 with additional detail to enable initialization according to one embodiment of the invention.

FIG. 8C illustrates circuit 600 with additional detail to enable initialization according to one embodiment of the invention. In FIG. 8C, inverter 606 is replaced with NAND gate 876. The inputs to the NAND gate 876 are the START signal and node 605. START is initially LO. This causes all pull-up drive transistors, 609 and 611, to conduct because of the resulting LO voltage on their gates. Once all clock wires are initialized, the START signal is asserted HI and the distributed clock generator operates as discussed.

Note that a clock signal in a conventional clock distribution system is generated from a single source. Whereas, the invention generates a clock signal through the interaction of a large number of cells distributed across the semiconductor die. Furthermore, note that a conventional clock distribution scheme is an open loop system. Hence, once the clock signal is generated it is propagated to the latches without compensation for die variations or transistor variations along the chain of inverters to the individual latches. In contrast, the invention provides a closed loop system that adapts to the conditions on the semiconductor die.

Furthermore, note that the clock signal is generated by the ping-pong action of two types of cells (or the hybrid cells) that are spatially separated.

Note that the current moves in a single direction on the clock wires. This mitigates electromagnetic fields produced by moving charges.

While in certain embodiments of the invention the terminals driven by like transistors within a cell are shorted (e.g., the terminals N, S, E and W in FIG. 1; the terminals N, S, E, and W in FIG. 2; the terminals W and E in FIG. 6; and/or terminals N and S in FIG. 6), in alternative embodiments of the invention one or more of them are not. In addition, in certain embodiments of the invention all of the terminals within the cell of FIG. 6 are shorted together, but, as a result, current no longer always moves in the same direction on a clock wire.

Also notice that the delay in any wire or logic in cells or the clock wires will have an effect on every other cell and wire in the system that diminishes the further the point is from the delayed cell. This limits skew to slow variations instead of the sudden skew variations found in state holding elements driven by clock signals derived through different branches of the H-tree.

Note that the power distribution system on an integrated circuit typically uses a two-dimensional grid structure and when possible is used as shielding for the noisy clock signal. In at least certain embodiments of invention, the cells and the clock wires are routed between positive and negative supply. Besides the layout and routing benefits, this leads to essentially free shielding (because the power supply provides the shielding) and shorter current return paths.

Note that embodiments of the invention do not use oscillators that are distributed across a chip and then coupled together. Rather it is an oscillator that is distributed across a chip. An oscillator cell (e.g., FIGS. 1, 2, and 7) cannot oscillate on its own. In the preferred embodiment, it is dependent upon four other cells that are dependent upon four other cells as well. The oscillator is the collection of cells stretched over the chip.

Alternative Embodiments

While embodiments of the invention has been described in relation to two dimensional fabrication techniques, other embodiment of the invention are implementable using three dimensional fabrication techniques. For example, in implementations using the two cell type approach, instead of the checker board illustration used earlier, imagine dice that are tightly packed such that the face on each die aligns with another. Each die is one of two types, red or black. Each die has a single dot on each face. Each red die is surrounded by six black dice and vice versa. Now replace the red and black die with six terminal pull-up and pull-down cells respectively. The cells are coupled by long clock wires that run through the dot on each face. Specifically, in one embodiment the third dimension is realized by adding two terminals to the four terminal cells. One of the extra terminals would project into the paper on which FIG. 1 and FIG. 2 is printed and one would project out. Other topologies (e.g., a tetrahedral topology of cells) are also within the scope of the invention. Of course, alternatively hybrid cells may be used.

While embodiments have been described with four terminals and a certain mixture of pull-up/pull-down drive transistors (hybrid cells having equal numbers of pull-up and pull down drive transistors; pull-up cells and pull-down cells respectively having all pull-up and pull-down driver transistors), alternative embodiments have a different number of terminals and/or a different mixture of pull-up/pull down driver transistors. In other words, the different cells of a distributed clock generator can any number and/or combination of pull-up and pull-down driver transistors, as long as the clock wire that couples two terminals of separate cells are driven by complementary drivers (e.g., if the driver whose drain is connected to a terminal is a pull-up transistor, then the driver connected to the terminal on the other end of the clock wire must be a pull-down transistor).

While the flow diagram shows a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A distributed clock generator comprising:
   a plurality of cells each including,
      a plurality of terminals,
      a cumulative clock edge detection circuit coupled to said plurality of terminals and having an output,
      a delay/amplification circuit coupled to said output of said cumulative clock edge detection circuit, and a driver circuit coupled to said plurality of terminals and to said delay/amplification circuit;
a plurality or clock wires, each of said plurality of clock wires coupling one of said plurality of terminals of one of said plurality of cells to one of said plurality of terminals of another or said plurality of cells.

2. The distributed clock generator of claim 1, wherein the plurality of cells are distributed in two dimensions.

3. The distributed clock generator of claim 1, wherein the plurality of cells are distributed in three dimensions.

4. The distributed clock generator of claim 1, wherein current travels in one direction on the plurality of clock wires.

5. The distributed clock generator of claim 1, wherein at least some of the plurality of cells and the plurality of clock wires are routed on an integrated circuit in proximity to the power supply routing on the integrated circuit.

6. The distributed clock generator of claim 1, wherein each of said plurality of cells is either a pull-up type cell or a pull-down type cell, and each of said plurality of clock wires couples one of said plurality of terminals of one of said pull-up type cells to one of said plurality of terminals of one of said pull-down type cells.

7. The distributed clock generator of claim 1, wherein each of said plurality of cells is a hybrid type cell in which each driver circuit includes at least one pull-up driver and at least one pull-down driver coupled to different ones of said plurality of terminals, and wherein said plurality of clock wires couple together the terminals coupled to pull-up drivers and pull-down drivers.

8. The distributed clock generator of claim 1, wherein each of said cumulative clock edge detection circuits phase mix clock signals received on said plurality of terminals.

9. The distributed clock generator of claim 1, wherein each of the cumulative clock edge detection circuits includes:
a plurality of transistors each having a gate, a source, and a drain, each of the gates of said plurality of transistors of said cumulative clock edge detection circuit are coupled to a different one of said plurality of terminals, the drains or said plurality of transistors of said cumulative clock edge detection circuit are coupled to together to form a node to provide said output, and the sources of said plurality of transistors of said cumulative clock edge detection circuit are coupled some to positive and others to negative supply.

10. The distributed clock generator of claim 1, wherein each of the cumulative clock edge detection circuits includes:
a plurality of inverters each having an input and output, each of the inputs or said plurality of inverters of said cumulative clock edge detection circuit are coupled to a different one of said plurality of terminals, the outputs of said plurality of inverters of said cumulative clock edge detection circuit are coupled to together to form a node to provide said output.

11. The distributed clock generator of claim 1, wherein each of the driver circuits includes:
a plurality of transistors each having a gate, a source, and a drain, each of the drains of said plurality of transistors of said driver circuit are coupled to a different one of said plurality of terminals, the gates of said plurality of transistors of said driver circuit are shorted together, and the sources of said plurality of transistors of said driver circuit are coupled to either positive or negative supply.

12. The distributed clock generator of claim 11, wherein the sources of said plurality of transistors of some of said driver circuits are coupled to positive supply, and the sources of said plurality of transistors of others said driver circuits are coupled to negative supply.

13. The distributed clock generator of claim 11, wherein the sources of said plurality of transistors of each of said driver circuit are coupled some to positive and others to negative supply.

14. An integrated circuit comprising:
a distributed clock generator including a plurality of cells collectively having a plurality of terminal pairs, each of said plurality of terminal pairs including a charging terminal coupled to a discharging terminal to have generated there between a clock signal having its two edges defined by alternating activation/deactivation of the charging terminal and the discharging terminal, the terminals of each of said plurality of terminal pairs being part of two different ones of said plurality of cells, said plurality of cells coupled together as a result of each being coupled to certain others of said plurality of cells by said plurality of terminal pairs; and
a plurality of sets of synchronous logic each having a clock input, each clock input of each of said sets coupled to receive the clock signal of one of said plurality of terminal pairs.

15. The integrated circuit of claim 14, wherein the plurality of cells are distributed in two dimensions.

16. The integrated circuit of claim 14, wherein the plurality of cells are distributed in three dimensions.

17. The integrated circuit of claim 14, wherein current travels in one direction between each of said plurality of terminal pairs.

18. The integrated circuit of claim 14, wherein at least some of the plurality of cells and their interconnection by said plurality of terminal pairs are routed on the integrated circuit in proximity to the power supply routing on the integrated circuit.

19. The integrated circuit of claim 14, wherein each of said plurality of cells includes either multiple of the charging terminals or multiple of the discharging terminals of said plurality of terminal pairs.

20. The integrated circuit of claim 14, wherein each of said plurality of cells includes both multiple of the charging terminals and the discharging terminals of said plurality of terminal pairs.

21. The integrated circuit of claim 14, each of said plurality of cells to phase mix clock signals received on said plurality of terminals.

22. The integrated circuit of claim 21, wherein, for each of said plurality of cells, the phase mix is an average phase when the difference in the arrival times of the clock edges of said clock signals on its terminals are within a period of time roughly equivalent to the rise/fall of the clock signal.

23. The integrated circuit of claim 21, wherein, for each of said plurality of cells, the phase mix is a non-linear function of the phases of said clock signals on its terminals.

24. A cell of a distributed clock generator comprising:
a set of terminals of said cell, each of said terminals in said set being one terminal of a different terminal pair, each of said terminal pairs including a charging terminal coupled to a discharging terminal to have generated there between a clock signal having its two edges defined by alternating activation/deactivation of the charging terminal and the discharging terminal;

a cumulative clock edge detection circuit coupled to said set of terminals to determine a single clock edge transition time reflective of transitions of said clock signals on said terminals, a driver circuit coupled to said set of terminals; and a delay/amplification circuit, coupled to an output of said cumulative clock edge detection circuit and to said driver circuit, to cause another clock edge transition of said clock signals to substantially simultaneously occur some delay time after each of said single clock edge transition times.

25. The cell of claim 24, wherein the set of terminals of said cell are charging terminals.

26. The cell of claim 24, wherein the set of terminals of said cell are discharging terminals.

27. The cell of claim 24, wherein the set of terminals of said cell including both charging and discharging terminals.

28. The cell of claim 24, wherein said cumulative clock edge detection circuit includes:

a plurality of transistors each having a gate, a source, and a drain, each of the gates of said plurality of transistors of said cumulative clock edge detection circuit are coupled to a different one of said set of terminals, the drains of said plurality of transistors of said cumulative clock edge detection circuit are coupled to together to form a node, and the sources of said plurality of transistors of said cumulative clock edge detection circuit are coupled some to positive and others to negative supply.

29. The cell of claim 24, wherein said driver circuit includes:

a plurality of transistors each having a gate, a source, and a drain, each of the drains of said plurality of transistors of said driver circuit are coupled to a different one of said set of terminals, the gates of said plurality of transistors of said driver circuit are shorted together, and the sources of said plurality of transistors of said driver circuit are coupled to either positive or negative supply.

30. The cell of claim 29, wherein the sources of said plurality of transistors said driver circuit are coupled to positive supply.

31. The cell of claim 29, wherein the sources of said plurality of transistors of said driver circuits are coupled to negative supply.

32. The cell of claim 29, wherein the sources of said plurality of transistors of said driver circuit are coupled some to positive and others to negative supply.

33. The cell of claim 24, wherein said cumulative clock edge detection circuit to determine said single clock edges transition time based on an average phase when the difference in the arrival times of the clock edges of said clock signals on said terminals are within a period of time roughly equivalent to the rise/fall of the clock signal.

34. The cell of claim 24, wherein said cumulative clock edge detection circuit to determine said single clock edges transition time as a non-linear function of the phases of said clock signals on said terminals.

35. The cell of claim 24, wherein said cumulative clock edge detection circuit includes smaller transistors than transistors in said driver circuit.

36. The cell of claim 24, wherein the delay time is tunable using variable delay inverters.

37. A method for generating a clock in a distributed manner, said method comprising:

each of a plurality of cells, coupled to adjacent others of said plurality of cells to receive clock signals, performing the following, determining a moment in time based upon die arrival times of current clock edges of received clock signals;

delaying a period of time after said moment in time; and triggering a next clock edge to said adjacent others of said plurality of cells after said delaying.

38. The method of claim 37, wherein said determining includes: averaging the phase of said current clock edges.

* * * * *